United States Patent
Zheng et al.

(10) Patent No.: US 11,755,749 B2
(45) Date of Patent: Sep. 12, 2023

(54) SYSTEM AND METHOD FOR REVERSE-TURING BOT DETECTION

(71) Applicant: ROYAL BANK OF CANADA, Toronto (CA)

(72) Inventors: Bingzhou Zheng, Aurora (CA); Salah Sharieh, Concord (CA); Nebojsa Djosic, Toronto (CA)

(73) Assignee: ROYAL BANK OF CANADA, Montreal (CA)

( * ) Notice: Subject to any disclaimer, the term of this patent is extended or adjusted under 35 U.S.C. 154(b) by 460 days.

(21) Appl. No.: 16/678,658

(22) Filed: Nov. 8, 2019

(65) Prior Publication Data

US 2020/0151347 A1 May 14, 2020

Related U.S. Application Data

(60) Provisional application No. 62/757,531, filed on Nov. 8, 2018.

(51) Int. Cl.
*G06F 21/60* (2013.01)
*G06F 21/62* (2013.01)
(Continued)

(52) U.S. Cl.
CPC ........ *G06F 21/604* (2013.01); *G06F 21/6227* (2013.01); *G06F 40/284* (2020.01);
(Continued)

(58) Field of Classification Search
CPC .................................................. G06F 21/604
See application file for complete search history.

(56) References Cited

U.S. PATENT DOCUMENTS

| 7,841,940 | B2 * | 11/2010 | Bronstein | ................ G09B 7/02 463/29 |
| 7,891,005 | B1 * | 2/2011 | Baluja | ..................... G06F 21/36 726/26 |

(Continued)

OTHER PUBLICATIONS

E. Bursztein, S. Bethard, C. Fabry, J. C. Mitchell, and D. Jurafsky. How good are humans at solving captchas? a large scale evaluation. In 2010 IEEE Symposium on Security and Privacy, pp. 399-413, May 2010.

(Continued)

*Primary Examiner* — Simon P Kanaan
(74) *Attorney, Agent, or Firm* — Norton Rose Fulbright Canada LLP (57) ABSTRACT

A system for controlling access to hosted services using computer generated question answer sets is described. The question answer sets are generated and include relationships which are designed to distinguish between human and automated system interpretation through the inclusion of a dynamically established transformation of characteristics in relation to objects described in the question answer sets. The dynamically established transformation provides an additional defense against malicious neural networks used to overcome mechanisms for distinguishing between humans and automated systems. Corresponding methods and devices are contemplated. In an additional embodiment, a decoy set of answer sets are also established to maintain a blacklisted set of suspected automated systems.

20 Claims, 5 Drawing Sheets

(51) Int. Cl.
*G06N 5/04* (2023.01)
*G06F 40/30* (2020.01)
*G06F 40/284* (2020.01)

(52) U.S. Cl.
CPC .............. *G06F 40/30* (2020.01); *G06N 5/04* (2013.01); *G06F 2221/2103* (2013.01); *G06F 2221/2133* (2013.01)

(56) References Cited

U.S. PATENT DOCUMENTS

| | | | | |
|---|---|---|---|---|
| 7,917,508 | B1* | 3/2011 | Baluja | G06F 16/58 |
| | | | | 707/754 |
| 8,904,493 | B1* | 12/2014 | Dibble | H04L 63/08 |
| | | | | 726/4 |
| 9,003,511 | B1* | 4/2015 | Yang | H04L 63/0263 |
| | | | | 726/13 |
| 9,146,917 | B2* | 9/2015 | Barborak | G06F 40/20 |
| 10,097,360 | B2* | 10/2018 | Hachey | G06F 21/36 |
| 11,132,432 | B2* | 9/2021 | Wu | G06F 3/04883 |
| 2012/0117239 | A1* | 5/2012 | Holloway | H04L 63/0884 |
| | | | | 709/226 |
| 2014/0196133 | A1* | 7/2014 | Shuster | H04L 63/126 |
| | | | | 726/7 |
| 2017/0161477 | A1* | 6/2017 | Liu | H04L 63/12 |
| 2020/0042506 | A1* | 2/2020 | Grigorov | G06F 16/217 |
| 2020/0099713 | A1* | 3/2020 | Rajput | G06N 5/046 |

OTHER PUBLICATIONS

Elie Bursztein, Jonathan Aigrain, Angelika Moscicki, and John C. Mitchell. The end is nigh: Generic solving of text-based captchas. In 8th USENIX Workshop on Offensive Technologies (WOOT 14), San Diego, CA, 2014. USENIX Association.

Ernest Davis and Gary Marcus. Commonsense reasoning and commonsense knowledge in artificial intelligence. Commun. ACM, 58(9):92-103, Aug. 2015.

Ian J. Goodfellow, Yaroslav Bulatov, Julian Ibarz, Sacha Arnoud, and Vinay D. Shet. Multi-digit number recognition from street view imagery using deep con-volutional neural networks. CoRR, abs/1312.6082, 2013.

Christopher D. Manning, Prabhakar Raghavan, and Hinrich Schutze. Introduction to Information Retrieval. Cambridge University Press, New York, NY, USA, 2008.

Suphannee Sivakorn, Jason Polakis, and Angelos D. Keromytis. I'm not a human : Breaking the google recaptcha. 2016.

* cited by examiner

SYSTEM AND METHOD FOR REVERSE-TURING BOT DETECTION

CROSS-REFERENCE

This application is a non-provisional of, and claims all benefit, including priority to, U.S. Application No. 62/757,531, entitled "SYSTEM AND METHOD FOR REVERSE-TURING BOT DETECTION", filed on 2018 Nov. 8, incorporated herein by reference in its entirety.

FIELD

Embodiments of the present disclosure generally relate to the field of user interface, and more specifically, embodiments relate to devices, systems and methods for bot-avoidance challenges.

INTRODUCTION

An approach to bot avoidance, gatekeeping on a user interface level to ensure human users are interacting with a service (e.g., a hosted service, online service) such as a website, includes the use of a program or system intended to distinguish human from machine input, such as a CAPTCHA™.

However, less and less websites are using the CAPTCHA™ system, as their effectiveness is being reduced as they are becoming more easily solved. These weaknesses lead to CAPTCHA™ becoming not suitable to separate persons from computers.

A new reverse Turing test called reCAPTCHA™ was introduced. The main idea of reCAPTCHA™ is to replace a text-based test with an image-based challenge. However, this solution were also cracked. For example, an AI bot system was noted to image-based reCAPTCHA™ challenges with the 70.78% accuracy in 19 seconds.

AI bot systems are being increasingly sophisticated and existing approaches are becoming increasingly vulnerable, especially if the existing approaches rely on aspects (e.g., image recognition) that is susceptible to neural network-based attackers.

SUMMARY

Since both CAPTCHA™ and reCAPTCHA™ could be cracked, in some embodiments, there is described an innovative solution to perform a reverse Turing test that serves as an improved computer implemented access control mechanism. The access control can be implemented as an automated testing mechanism that operates as a threshold/gateway mechanism between an unsecured portion and an secured portion of a secured access resource (e.g., an online banking platform).

The automated testing mechanism can be invoked as a computer function that causes rendering of visual elements (or audio elements) of a user interface (e.g., a graphical user interface) that presents a challenge. The challenge is a threshold can be provided as a set of visual interface elements (or interactive audio interface elements) listing a set of potential candidate answer choices.

The user can use an input device to indicate candidate answers for selection, and if the response is satisfactory (e.g., the correct answers are chosen or incorrect answers are selected if asking for incorrect answers), the user can be given access (or at least has passed this threshold challenge). Granting access can be conducted by providing a response to an API to the underlying secured resource, such as a data message indicating that this user is likely a human.

A weakness of alternate approaches is that their underlying technology becomes susceptible over time to machine learning based malicious systems. These machine learning based malicious systems utilize natural language processing model data architectures (e.g., neural networks) or other data architectures that are used to predict the correct answer(s) for a given automated testing mechanism. Supervised training can occur given a sufficiently large number of training examples and outcomes. Once trained, the machine learning based malicious systems can be provided new inputs from a challenge issued (e.g., from an online banking platform). For example, vanilla visual and question/answer-based approaches (e.g., "select all traffic lights") are vulnerable to such attacks.

The machine learning based malicious systems are able to then predict the correct answer using the underlying trained neural network. The systems can attempt to address these weaknesses by creating ever harder questions, however, at some point, it becomes too difficult for human users and the access control system becomes technically ineffective (e.g., "select all traffic lights with a green light and an advance signal light, across a major road and coupled to a pedestrian walk light having a walk sign lit" would be very cumbersome, even for humans).

A proposed system of some embodiments is adapted as an automated testing mechanism that includes specific technical improvements adapted to increase a difficulty level in respect of machine learning based malicious systems while aiming to avoid overburdening human users. This automated system is based on a combination of natural language understanding, logical reasoning, and common sense reasoning made available through a backend database of structured data objects having interconnections representing common characteristics/groupings (and in some embodiments, sub characteristics and sub groupings). Corresponding methods for generation are also described.

The automated system interconnects with other systems to provide a threshold interface for a user of the system to encounter as a challenge. The challenge can be a graphical user interface (or, in some embodiments, an audio-based interface) where user interface elements are presented. The specific user interface elements are adapted to request inputs from the user indicative of selected answer choices (there may be one or more correct answers, or conversely, incorrect answers). A challenge (e.g., question stem string) is introduced.

The challenge can be generated (in some embodiments static, and in other embodiments, dynamic) from the backend data storage storing the structured data objects. In particular, the challenge mechanism traverses the structured data objects and during question generation, one or more "mutation" transformations are introduced into a logical interconnection. The mutation is a modification of one or more relationships represented in the characteristics of the data objects, modifying the relationship in a manner that would not occur naturally. For example, the mutation, in a simplified example, can indicate that in this fictional world, all vegetables are meat (harder examples can be based on sub-categories and sub-classifications). The mutations are not limited to simple transpositions, and more complex mutations are possible, such as those requiring further logical leaps that are relatively easy for humans to handle using human-based common sense and logical reasoning but are difficult/have not been modelled by malicious user machine learning models. For example, a mutation can be related to a sub-category to a category, etc. (instead of "in this world, all fruits are animals", "in this world, all drupes are animals"). The choice of the mutation to be a sub-category (or a sub-sub category) also represents an increase in difficulty.

The mutation represents one or more transformed classification relationships used to present a corresponding "mutant" relationship that is inconsistent with conventional relationships, so these relationships would not exist in the training sets that the malicious neural networks would be training on. For example, these relationships may only exist in the virtual world posited by the challenge (e.g., "in this world [ . . . ]"). The relationships, accordingly, go against traditional knowledge of various domains, such as the physical world (e.g., "in this world, penguins live in desert caves in the Sahara"). This mutation can be adaptive and can be tunable such that the difficulty level can be increased or decreased through the complexity of the new relationship that is posited in the question.

The selection of the mutation(s) and establishment can be conducted dynamically during generation. The challenge is encapsulated in the form of a question that is presented to the user (e.g., through a graphical user interface rendering an interface control element on a display or as an audio phrase played through a speaker). The system generates candidate answers which are presented to the user. The candidate answers represent different arrangements of the objects and statements that can be true or false, in a world as modified by the mutation transformation(s).

The user then selects one or more candidate answers, for example, through an input mechanism, such as a mouse, a touch screen, audio capture responses, among others. Based on the selected candidate answers, an access control decision (e.g., allow/deny) is provisioned. If the correct candidate answers are selected, the access control decision is to allow the access. If incorrect candidate answers are selected, the access control decision is to deny the access. Corresponding control signals are generated and provided to downstream systems (e.g., through an internal API).

Because the mutation cannot be known beforehand by the machine learning based malicious systems and changes from challenge to challenge, the value of collected question/answer pairs (scraping) by malicious users for input into their machine learning models is significantly reduced, as the malicious users cannot rely on pre-existing libraries of known characteristics of objects from the real world. Answers that would otherwise be correct if there were no mutations are simply incorrect. Furthermore, the scraped question/answer pairs would provide little value for the malicious users as supervised learning training sets as the mutations cause the perturbation of linkages, disrupting the commonality of characteristics that is required for effective training of the model of the malicious system.

The automated system described in embodiments herein thus provides an increased layer of protection against a new generation of malicious users who employ artificial intelligence/machine learning mechanisms to overcome automated Turing tests. The inclusion of the dynamically established mutation(s) in question/answer pair generation impedes training and validity of malicious models trained using openly available data sets and data representations.

The automated system of these embodiments is directed to automatically protecting systems designed for human users from being compromised by malicious user systems, such as automated breaching systems that employ machine learning models and natural language processing-based neural networks. While no system is foolproof, the embodiments herein provide improved protection against machine-learning based automated attackers by rendering their trained neural networks and training sets invalid. Variant embodiments are described as well.

In an embodiment, decoy answers such that the selection of such decoy answers can also be used to identify reverse-Turing bots. If the candidate answers that are otherwise correct absent the mutation(s) are chosen, the system may invoke specific malicious user countermeasures, such as allowing the malicious user to access a sandboxed environment, invoking additional monitoring/surveillance of malicious user activities, flagging a user as suspicious (e.g., by flagging a Boolean variable).

In another embodiment, a tunable challenge level can be established by generating question/answer pairs, the challenge level tunable through the number of mutations established and the number of characteristics and/or relationships represented in the challenge, or the number of objects presented in the challenge question. The challenge level can be tuned, for example, responsive to how much the system suspects the user is an automated bot or malicious user (e.g., time of usage, IP address, number of failed attempts, suspicious mouse/keyboard inputs, suspicious timing). In another embodiment, the automated challenge is only triggered when the system being accessed has determined that the user's access attempts are suspicious (e.g., time of usage, IP address, number of failed attempts, suspicious mouse/keyboard inputs, suspicious timing).

In a first aspect, there is provided a computer implemented method for controlling access to a hosted service. The method includes retrieving, from a backend question bank data storage, one or more question strings and a plurality of candidate answer strings having one or more correct answer strings. These question strings are provided in the form of string subsections, including, for example, string tokens directed to a first semantic object type. The question strings can, in non-limiting examples, be directed to stories and statements relating thereof, and the semantic object types can include animals, plants, seeds, meat.

The question strings may include one or more statements indicating one or more assertions of fact (e.g., "Zoe wants to eat some vegetable and meat"), and a section indicating a clause to be answered (e.g., "which of the following may be true?"). The question string can be presented on a user interface, through a rendering on a display, coupled with a set of candidate answer strings. A user (or a bot) may receive this challenge, and in response, select one or more of the candidate answer strings responsive to the question string being posed.

Accordingly, a set of candidate answer strings are retrieved indicative of the user's selection. These candidate answer strings can include string tokens directed to a second semantic object type, for example, the strings could include the following four strings: (1) "A) Zoe swallows some duck and sprout" (2) "B) She devours some plum and sprout"; (3) "C) She swallows some turkey and goose", (4) "D) Zoe eats some apricot and sprout".

The set of candidate answer strings are free of string tokens directed to the first semantic object type, and require the user to draw an relationship as between the first and second semantic object type. The first semantic object type and the second semantic object type are related through a mutated common sense or common classification relationship (e.g., a one or more transformed classification relationships) that may be relatively straightforward for a human to determine, but may be difficult for automated software (e.g., AI bot) to determine. For example, the relationship could require a logical gap as between categories in a question stem and concrete objects in the questions, requiring common sense to fill the gap. In the example above, any person with common sense can easily tell the statement A is true, but B, C, D are false.

Furthermore, in an embodiment, an additional layer of difficulty is provided through establishing hypothetical positional relationships as between the objects in the candidate answer strings, instead of posing the positional relation as directly between the objects of the question string. A path finding exercise may thus be required to establish which of the candidate answer strings are correct. Path finding exercises and positional relationships (e.g., in Euclidean space) add an additional requirement of common sense reasoning, which helps distinguish between automated software and human interactions. In another embodiment, another paradigm can include common sense object classifications.

An input is provided by the computing device, indicating a selection of a subset (e.g., through radio button selections, a list of interactive checkboxes). If the selected subset of the plurality of candidate answer strings match the one or more correct answer strings, access is provisioned to the service. For example, access control signals may be generated and transmitted, electrical signals can be sent, website traversal to a subsequent page or protected area is effected, etc.

In another aspect, further difficulty is further included in the method whereby the first semantic object type and the second semantic object type each pertain to otherwise disjointed taxonomic structures, and each question string of the one or more question strings includes a string subsection representing a stated overlap (e.g., establishing an overlap where none existed before) between the taxonomic structures of the first semantic object type and the second semantic object type to establish the common sense or common classification relationship; and the common sense or common classification relationship between the first semantic object type and the second semantic object type is represented in each correct answer string of the one or more correct answer strings.

In another aspect, a decoy mechanism is provided whereby the first semantic object type and the second semantic object type have a first common classification relationship, and wherein each question string of the one or more question strings includes a string subsection representing a stated overlap between the taxonomic structures of the first semantic object type and the second semantic object type to establish a second common classification relationship.

Both the first common classification relationship and the second common classification relationship between the first semantic object type and the second semantic object type are represented in each correct answer string of the one or more correct answer strings.

However, in this example, the plurality of candidate answer strings includes a decoy subset having one or more decoy answer strings, the decoy subset based on the first common classification relationship only, or the second common classification relationship only.

If an automated service is traversing the question, it may catch one but not both relationships and select only answers where only one relationship is expressed. If so, in a preferred embodiment, responsive to the selected subset of the plurality of candidate answer strings matching the one or more decoy answer strings, the computing device is added to a blacklist data structure, denoting it as a potential automated service.

The system providing such features in various embodiments can include a front-end web processor being provided at an end user computing device, a backend computer server (e.g., webpage hosting production server), or intermediary systems thereof (e.g., an intermediary bot/human filtering service server).

The output of the system can include data messages representing structured data objects indicative of the question. The underlying secured resource can control a display to render a user interface showing the challenge. The challenge inputs from the user are then provided back to the system (e.g., through a data message on an API through a message bus). The challenge inputs are then validated for correctness and the system then sends a response to the secured resource indicating whether the user should be granted access or another step should be taken (e.g., routed to a decoy website). In an alternate embodiment, the system provides a full question/answer data message and the secured resource presents the challenge and validates using the answers provided to it. In this embodiment, there is a potentially increased vulnerability, but the embodiment is computationally simpler than requiring data messages to be sent back and forth.

In a variant embodiment, the system can be directly incorporated into the secured resource's systems, such that questions and corresponding answers can be generated dynamically when a challenge is presented. This approach may be slower but may require less data storage, and can be useful where there is a lower volume of challenge request generations.

Corresponding devices, systems, and apparatuses are contemplated, including corresponding computer readable media (e.g., diskettes) storing machine interpretable instructions (e.g., object code, compiled binaries, source code), which when executed by a processor, cause the processor to perform steps of methods described herein.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

As noted in a paper by SivaKorn el al., both CAPTCHA™ and reCAPTCHA™ could be cracked by an automated system, and thus there are technical deficiencies that could lead to automated systems masquerading as human actors. This could be a significant problem as automated bots could be used to scrape websites for information, sign up for human-only offers (e.g., credit cards, banking products), among others. For example, a newspaper could be overwhelmed with billions of new subscribers purporting to be humans requesting a free week of newspaper delivery to fictitious addresses.

Malicious users have evolved their approach to challenging access controlled systems. Older, simpler approaches such as brute force based and dictionary attacks have been rendered ineffective through improved security protocols. CAPTCHAs were effective for a time to distinguish between human users and automated users. However, CAPTCHAS are vulnerable over time to machine learning based malicious systems.

These machine learning based malicious systems utilize natural language processing model data architectures (e.g., neural networks) that are used to predict the correct answer (s) for a given automated testing mechanism. These approaches thrive by using vast amounts of data sources (e.g., Twitter™, Wikipedia™, CIFAR, audio databases) to train neural networks, such as natural language processing. Malicious users, such as hackers, can employ these neural networks to devastating effect against automated Turing tests by having the neural networks conduct discrimination/ classification tasks that were previously very difficult for task-specific programming based attacks (e.g., the neural network does not need to be specifically programmed for tasks such as image recognition and rather, it learns over a number of training epochs).

Accordingly, supervised training of the malicious user neural networks can occur given a sufficiently large number of training examples and outcomes. Once trained, the machine learning based malicious systems can be provided new inputs from a challenge issued (e.g., from an online banking platform). The machine learning based malicious systems are able to then predict the correct answer using the underlying trained neural network. The systems can attempt to address these weaknesses by creating ever harder questions, however, at some point, it becomes too difficult for human users and the access control system becomes technically ineffective.

Accordingly, there is a desire for improved approaches for sequestering human interactions from automated system interactions. An innovative solution is described in various embodiments herein, which, for example, include a graphical user interface frontend that provides a rendering of a challenge, which is rendered based on control signals from a backend that are adaptively generated. The backend utilizes natural language understanding (NLU), common sense reasoning (taxonomy and ontology reasoning), and logic reasoning to challenge automated or artificial intelligence system.

In particular, an improved extra challenging layer is provided as noted in embodiments below, based on ontology reasoning and an open data set, for example, in relation to positional relationships, path finding scenarios, or other types of relationships that aid in distinguishing between human pattern recognition and machine-based pattern recognition.

It is important to note that in some embodiments, an open data set, as opposed to a closed data set, is used, which helps overcome issues in relation to closed data sets. In the domain of NLU, a closed data set means that all information that need to answer correctly candidate answer strings are in the question string.

An example is as follows:
A spider lives in the top of a lion. The spider also lives in the east of a jay. Which of the following could be true?
A) The route from the spider to the lion is "south"
B) The route from the jay to the spider is "east"
A) False, B) True In this scenario, what is added in some embodiments is to add one more challenging layer (e.g., mutation transformation) on the top of positional relationship and path finding problem. This scenario becomes a challenging problem based on an open data set instead of a close data set, which means that not all information appears in the question string. There can be multiple mutations and modifications, and a simplified example is provided.

An example is as follows:
A spider lives in the top of a lion. The spider also lives in the east of a jay. Which of the following could be true?
A) The route from the web to the den is "south"
B) The route from the nest to the web is "east"
A) False, B) True In this example, web, den, nest never appear in the question string. But they appear in the candidate answer strings. This is an open data set problem, which makes NLU problems more difficult. To solve this kind of problem, a human needs to turn to ontology reasoning, a kind of common sense reasoning, to find the relationship between animals and their homes. This reasoning is still difficult for artificial intelligence/automated computing systems.

The approaches described herein are directed to scalability, as such a challenge platform may be widely utilized across a large set of computing systems requiring access provisioning or identity verification. Question and answers, and generation/rendering thereof can be controlled in some embodiments to cause the process to be more simple or complex, and related to fewer entities or more entities as long as the system is able to add enough knowledge into a world model repository.

Figure 1:
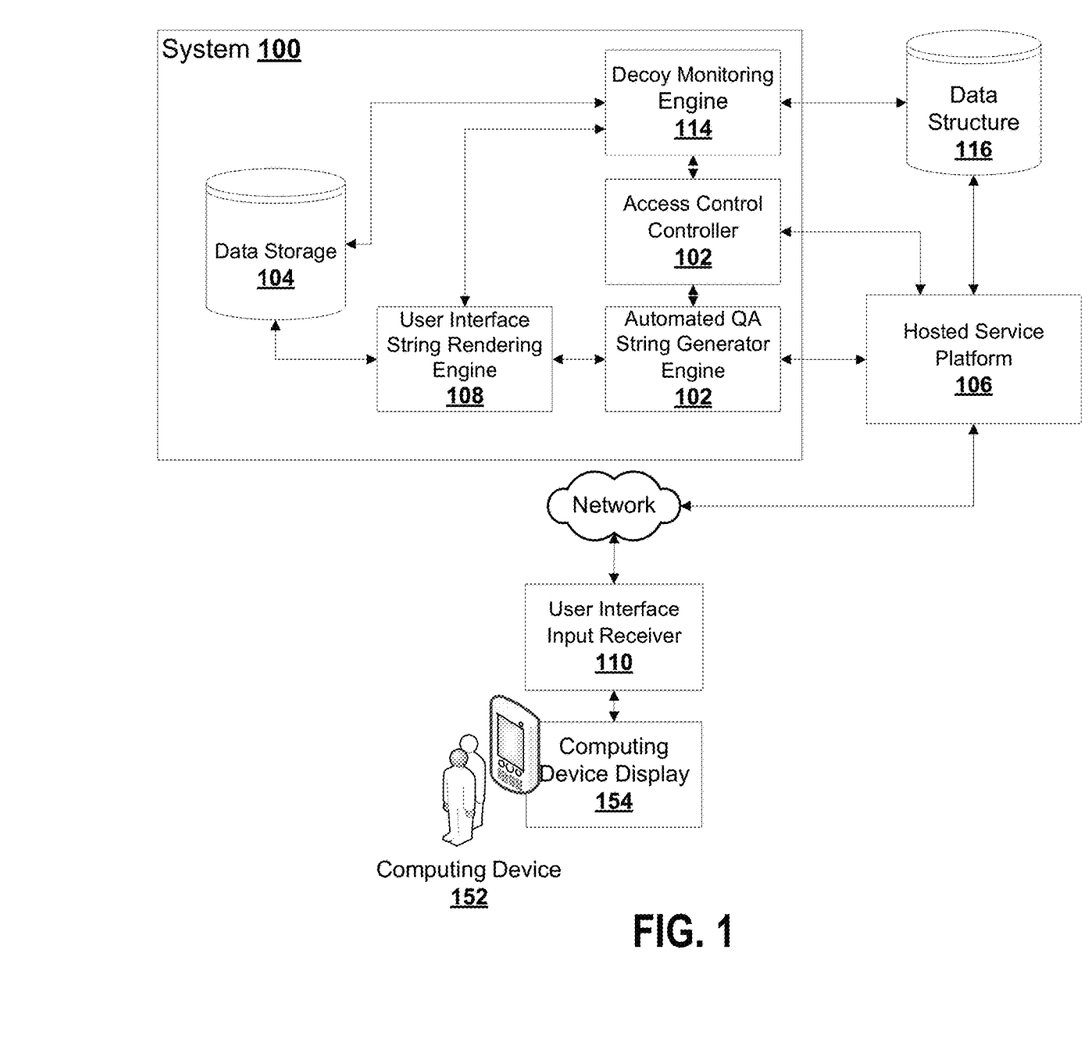
FIG. 1 is a block schematic of an example system for reverse-Turing bot detection, according to some embodiments.

FIG. 1 is a block schematic of an example system for reverse-Turing bot detection, according to some embodiments. The example system 100 is based on natural language understanding and common sense reasoning.

In FIG. 1, various components are shown as a non-limiting example embodiment. Other components are possible, and components can be implemented using computer technology including hardware, software, embedded firmware, or combinations thereof.

The system 100 providing such features in various embodiments can include a front-end web processor being provided at an end user computing device, a backend computer server (e.g., webpage hosting production server), or intermediary systems thereof (e.g., an intermediary bot/ human filtering service server). The system 100 is a mechanism that can be invoked, for example, through an API, by applications, such as a hosted service platform 106 (e.g., online banking system) as a challenge mechanism between a virtual threshold between an unsecured resource (e.g., home page) and a secured resource (e.g., an individual's online banking account).

The system 100 can operate as a backend system that can be implemented in a data center. The hosted service platform 106, in some embodiments, can include user characteristic monitoring mechanisms, such as network traffic snoopers, input trackers, cookies, among others, which can help gather information relating to behaviors that can be used to determine whether system 100 should be triggered by invoking a function and/or passing along parameters (e.g., tunable difficulty level). These behaviors can include IP addresses, input cursor movements, keyboard inputs, prior webpages traversed, etc.

In some embodiments, system 100 is not always triggered. In alternate embodiments, system 100 is triggered at different difficulty levels tuned based on hosted service platform 106's tracking and determination of a suspicion level (e.g., suspicion score) of the user.

System 100 is configured for providing various types of challenging candidate questions and corresponding solutions that are obtained in relation to techniques that require machine reading comprehension and common sense reasoning to solve the questions posed.

The system 100, is directed to a computing platform that includes components for handling scenarios (e.g., question templates), generators for automated question/answer string determination, a world model repository (e.g., stored in a data storage), and a rendering engine that is configured for dynamically generating user interface front-ends representing the selected question-answer strings.

In particular, (a) the automated QA string generator loads a question template, b) the system 100 generates a random number (number1) to decide the complexity of the question, then fetch the instances from world model repository (e.g., the data storage) and use them to instantiate the placeholders based on the complexity, c) the system 100 generate a random number2 (constrained by number1) to decide how many candidate answer strings to create and then generate a random number3 (constrained by number2) to decide how many candidate answer strings should be true, d) the system 100 fetches the instances from world model repository and use them to instantiate the placeholders in the candidate answer strings based on true or false choice, and e) the system 100 concatenates question and answer strings.

Scenarios can be considered question templates with some placeholders. When system 100 generates questions, it can fetch categories or entities from world model repository to fill in these placeholders. The question system provides improved scalability as a designer can scale the questions to make it simple or complex, and related to fewer entities or more entities as long as there can be sufficient knowledge stored in the world model repository.

The system 100 shown in FIG. 1 is a non-limiting example, and alternate, different, less, more components are possible.

In some embodiments, an automated question/answer string generator engine 102 is provided that, based on a question bank, reference dictionary, or semantic object library, generates question strings and answer strings. The automated question/answer string generator engine 102 is configured to traverse groups of semantic objects which, in some embodiments, are stored with a series of commonsense relationships established as between different types or classifications of semantic objects (e.g., stored in the form of identifiers, linkages).

As noted below, in some embodiments, the different types of relationships are not always based only on common-sense relationships, but in some embodiments, the relationships are specifically stated (and may be counterintuitive) as part of a question stem. For example, questions having the question stem "in this exercise, all vegetables are meat", may have an additional specifically stated relationship between vegetable objects and meat objects. As noted below, in some embodiments, the stated relationships can be utilized to establish decoy answers such that the selection of such decoy answers can also be used to identify reverse-Turing bots.

The automated question/answer string generator engine 102 generates reference sets of questions and answers stored in backend question bank data storage 104 (which can be considered a world model repository). The data storage 104 data objects can include a dictionary of objects stored in a connected graph or nodal topology, represented in the form of data structure objects, such as elements in an array, a linked list, etc. Each object has characteristics stored therein and can be linked to one another through shared characteristics. Each object can be represented in the form of JSON objects or XML objects, among other potential approaches for representation as textual objects. Characteristics can be stored, for example, as Boolean values in the data objects (e.g. isVegetable=TRUE).

The sets of questions and answers are generated based on one or more mutations that are captured in each question, and dynamically vary from question to question. For example, a first question may have two mutations, establishing mutant characteristics whereby bicycles are now vegetables and red objects are now serrated objects. A second question may have different mutations, or no mutations at all. The mutations are not limited to simple transpositions, and more complex mutations are possible, such as those requiring further logical leaps that are relatively easy for humans to handle using human-based common sense but are difficult/have not been modelled by malicious user machine learning models.

These mutations are dynamically established for each question, and used to generate the sets of correct/incorrect candidate answers for that question. As the mutations are not established beforehand, when they are encountered by a human user, a logical leap based on human common sense reasoning is required to answer the question, taking into account the mutations.

Hosted service platform 106, upon receiving a request for access, is configured to retrieve one or more question strings and a plurality of candidate answer strings having one or more correct answer strings.

Each question string is stored on the backend question bank data storage 104 and includes at least a question including string tokens directed to a first semantic object type, and each of the candidate answer strings is also stored backend question bank data storage 104 and includes string tokens directed to a second semantic object type and free of string tokens directed to the first semantic object type.

The questions and answers retrieved include common sense or common classification relationship as between the first semantic object type and the second semantic object type. Because the mutation cannot be known beforehand by the machine learning based malicious systems and changes from challenge to challenge, the value of collected question/answer pairs (scraping) by malicious users for input into their machine learning models is significantly reduced, as the malicious users cannot rely on pre-existing libraries of known characteristics of objects from the real world.

Answers that would otherwise be correct if there were no mutations are simply incorrect. Furthermore, the scraped question/answer pairs would provide little value for the malicious users as supervised learning training sets as the mutations cause the perturbation of linkages, disrupting the commonality of characteristics that is required for effective training of the model of the malicious system.

A user interface string rendering engine 108 is configured to render the one or more question strings and the plurality of candidate answer strings on a display 154 of a computing device 152 requesting access to the hosted service.

A user interface input receiver 110 is configured to receive from the computing device 152, one or more input data sets representing a selected subset of the plurality of candidate answer strings. Responsive to the selected subset of the plurality of candidate answer strings matching the one or more correct answer strings, an access control controller 112 generates signals for provisioning access to the hosted service.

In some embodiments, an additional decoy monitoring engine 114 is provided, whereby if the strings include additional stated relationships and the selected subset of the plurality of candidate answer strings match only those in accordance one of the plurality of relationships, a user identifier of the computing device 152 is added to a data structure 116 storing suspicious identities. In some embodiments, the data structure 116 is a blacklist of identities. In future requests, the data structure 116 is traversed to assess whether the identifier is on a blacklist, and if so, access can be automatically denied.

The automated system described in embodiments herein thus provides an increased layer of protection against a new generation of malicious users who employ artificial intelligence/machine learning mechanisms to overcome automated Turing tests. The inclusion of the dynamically established mutation(s) in question/answer pair generation impedes training and validity of malicious models trained using openly available data sets and data representations.

At least two challenging candidate solutions are described, in accordance with different paradigms. Other paradigms are possible if they are able to be represented as characteristics in the data storage 104. The below examples are provided as non-limiting illustrative approaches.

Path Finding and Properties Mapping

The first paradigm of positional reasoning and path finding evolves from the bench-mark tasks. In this example, the system 100 is based on open data sets by adding one more challenging layer, which is not presented in other approaches. Bots need to use the techniques machine reading comprehension and common sense reasoning to solve the questions posed by the interface 108.

An example about the path finding based on open data set is presented as follows. This example contains a story and several questions. The story describes the positional relationship of several animals.

The directions that a story may mention include "east", "west", "north", "south", "top", and "bottom". The questions focus on the positional relations of the homes of the animals instead of asking the positional relation directly between animals in the story. Since the home of animals are not presented in the story, it need common sense reasoning to solve the mapping from animals to the home of animals. For humans, it is not difficult to figure out that the spider lives in a web, the lion lives in a den, and the jay lives in a nest.

Figure 2:
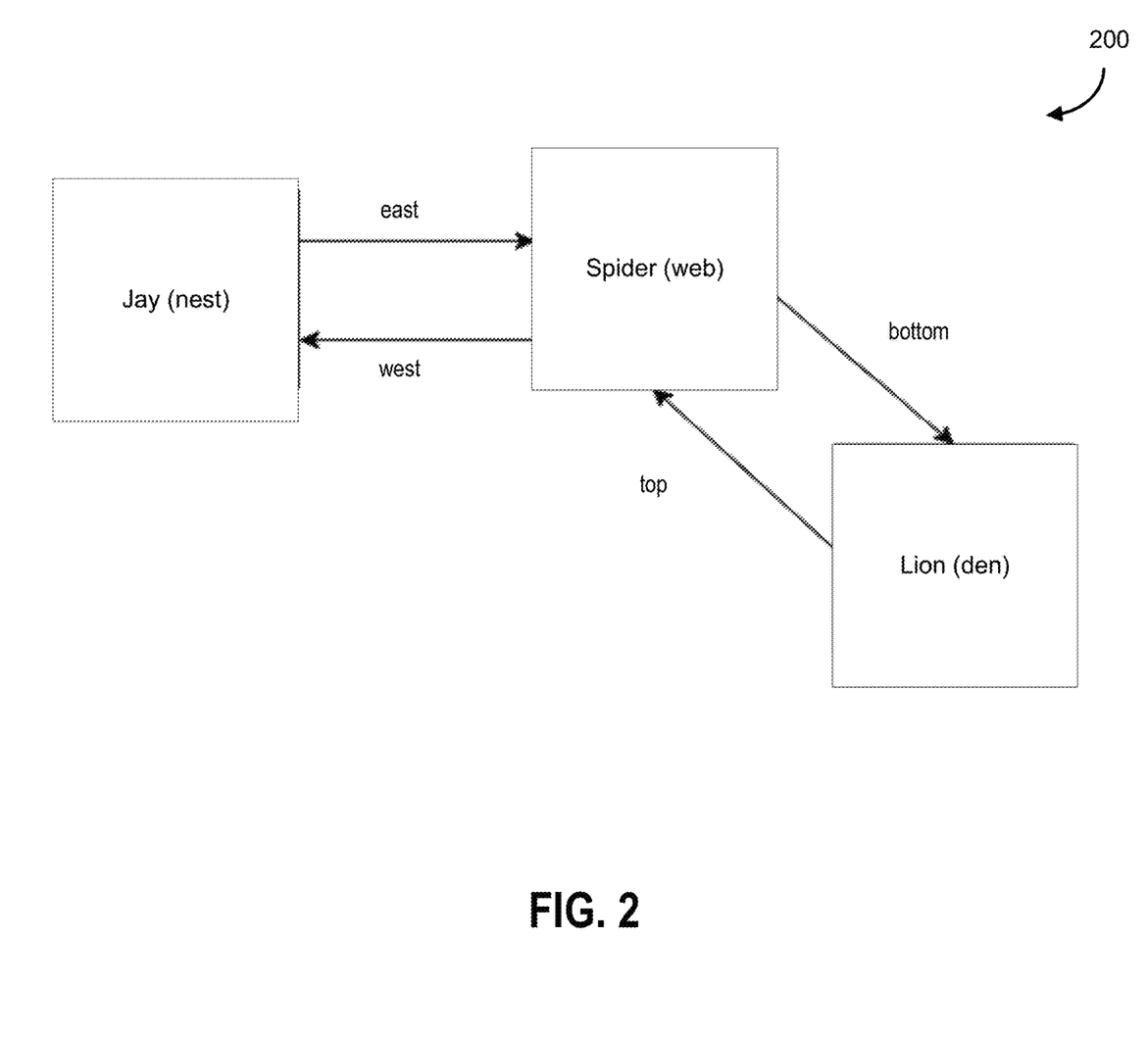
FIG. 2 is a positional relationship diagram for an example question set, according to some embodiments.

Question string example: A spider lives in the top of a lion. The spider also lives in the east of a jay. Which of the following are true?
A) The route from the nest to the den is "west, west"
B) The route from the den to the nest is "top, west"
C) The route from the web to the den is "south"
D) The route from the nest to the web is "east"

If a user draws a diagram on the positional relationship 200, as shown in FIG. 2, it is easy for a human to find the statements: A and C are false, and B and D are true.

The paradigm of positional reasoning and path finding are not limited to the category of animals and the mapping from animals to their homes. Any objects in some category, which own some unique property, can be used in the scenario.

Other logical assumptions that can be used for relationships can include time, position, geography, among others. Categories/attributes can include, for example, object types, attributes (e.g., homes), geospatial characteristics (height).

The best performance of AI achieving on the original path finding tasks based on closed data sets is 36% accuracy. The path finding tasks described herein and provided by the system 100, which need the extra common sense reasoning, provide a tougher Turing test.

Object Classification with Data Poisoning

The second paradigm is about classification and common sense. When creating this kind of Turing test, several categories are chosen, which contain objects such as daily life objects, foods, and so on. The objects in each category can be further classified into several disjoint subcategories. The questions are normally related to decide if some objects belong to some category or subcategory.

For instance, the categories meat, vegetable, and fruit are selected to create the story and questions as follows.

Zoe wants to eat some vegetable and meat, which of the following may be true?
A) Zoe swallows some duck and sprout
B) She devours some plum and sprout
C) She swallows some turkey and goose
D) Zoe eats some apricot and sprout The story says that a person wants to eat vegetable and meat, which are some concepts on the category level. The interface poses statements having semantic objects such as duck and sprout, which are provided on the object level in the questions.

There is a gap between categories in the story and concrete objects in the questions. It needs common sense reasoning to fill the gap. For this example, any person with common sense can easily tell the statement A is true, but B, C, D are false.

The second paradigm presented so far is relatively for human to understand and handle. However, an automated system may utilize taxonomic reasoning and information retrieval to answer the questions pertaining to simple taxonomic structures, say vegetable, fruits, and animal etc. In some embodiments, the automated question/answer string generator engine 102 is configured to generate sets where some simple taxonomic structures are overlapped, which are originally disjoint, in order to make the second paradigm more difficult for an automated system, especially an automated system utilizing neural networks and/or trained natural language processing machine learning models.

For example, drupe is a simple taxonomic structure and a subset of fruit category. A fruit in this subcategory has "a fleshy fruit with thin skin and a central stone containing the seed" by the definition of botany.

Concrete examples include peach, cherry, and almond etc. To make taxonomic reasoning and information retrieval less straightforward, the automated question/answer string generator engine 102 can make drupe belong to both fruit and meat in the context of stories. The user interface string rendering engine 108 then may generate visual outputs indicative of a statement that some fruit in drupe category is meat in the questions.

An example statement would then be: People in the city where Zoe lives think that drupe is meat. Zoe wants to eat some vegetable and meat, which of the following may be true for those people?
A) Zoe swallows some duck and sprout
B) She devours some plum and sprout C) She swallows some turkey and goose D) Zoe eats some apricot and sprout Plum and apricot are drupe, which are, in turn, fruit. But they are meat as well in the context of the story. Thus, the statements B and D become true.

This updated second paradigm shows that traditional taxonomic reasoning and information retrieval do not work anymore.

An automated system should perform logical deduction based on the context of stories to answer the questions of the second paradigm correctly in addition to common sense reasoning. Besides improving the difficulty of reasoning, this change also poisons data.

In each story, in an embodiment, an approach may be to randomly choose some subcategory in one category and then make it belong to a second category as well. The overlapped taxonomic relation is the assumption only valid in the context of this story, but it do not hold in other stories. If some people deliberately gather those data to train their automated systems, they only get some poisoned data, which could mislead their automated systems.

The poisoned data can also be used to establish blacklists, which are used for pre-emptively identifying and rejecting requests from computing devices suspected of being automated systems.

In this example, the approach emphasizes taxonomy reasoning (mapping from category concept to sub category concept or to concrete entities), logic reasoning, and data poisoning. In a further embodiment, the logical assumption, like "People in the city where Zoe lives think drupe is meat", can be further extended to include time and geography etc. This can lead to unlimited questions due to unlimited assumption.

Figure 3:
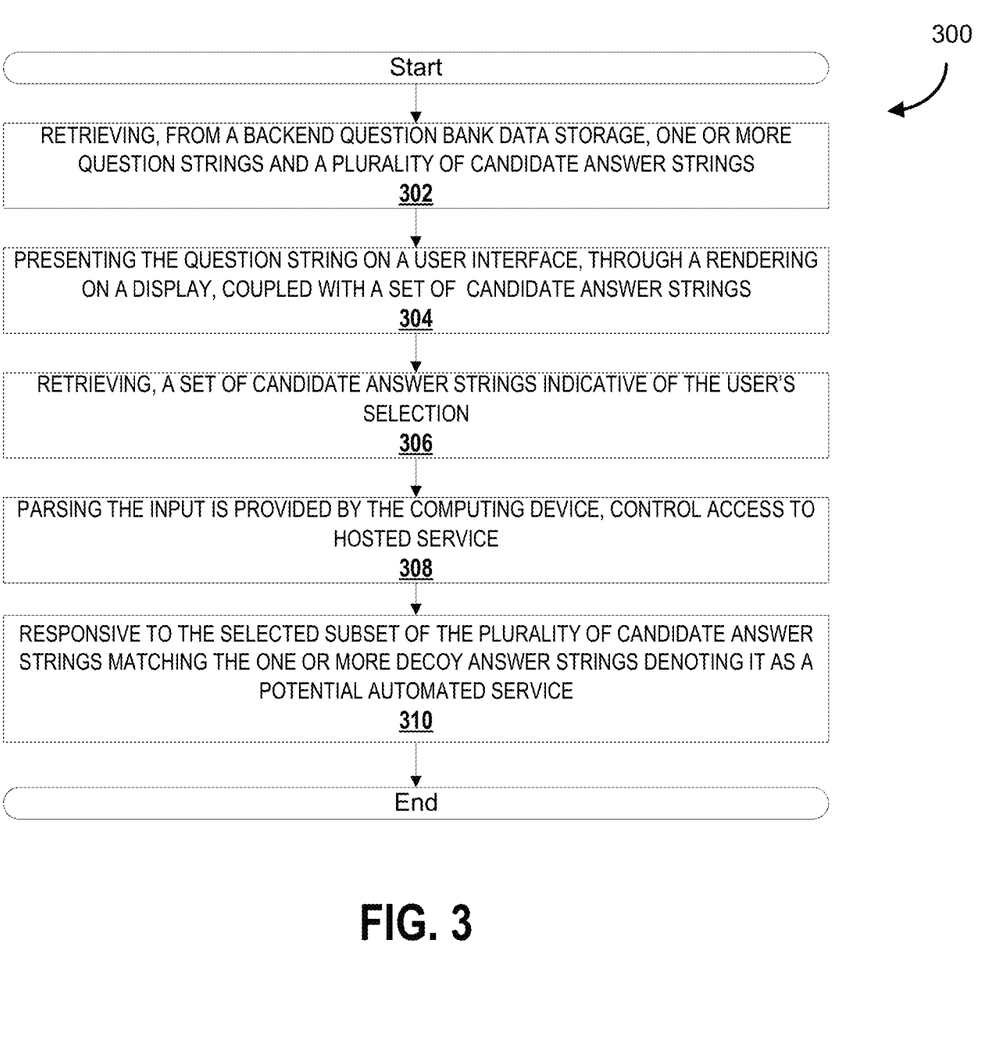
FIG. 3 is an example method diagram illustrating an approach for controlling access to a hosted service, according to some embodiments.

FIG. 3 is an example method diagram illustrating an approach for controlling access to a hosted service, according to some embodiments.

The method 300 includes at 302, retrieving, from a backend question bank data storage, one or more question strings and a plurality of candidate answer strings having one or more correct answer strings.

These question strings are provided in the form of string subsections, including, for example, string tokens directed to a first semantic object type. The question strings can, in non-limiting examples, be directed to stories and statements relating thereof, and the semantic object types can include animals, plants, seeds, meat. The question strings may include one or more statements indicating one or more assertions of fact (e.g., "Zoe wants to eat some vegetable and meat"), and a section indicating a clause to be answered (e.g., "which of the following may be true?").

At 304, the question string is presented on a user interface, through a rendering on a display, coupled with a set of candidate answer strings. A user (or a bot) may receive this challenge, and in response, select one or more of the candidate answer strings responsive to the question string being posed.

At 306, a set of candidate answer strings are retrieved indicative of the user's selection. These candidate answer strings can include string tokens directed to a second semantic object type, for example, the strings could include the following four strings: (1) "A) Zoe swallows some duck and sprout" (2) "B) She devours some plum and sprout"; (3) "C) She swallows some turkey and goose", (4) "D) Zoe eats some apricot and sprout".

The set of candidate answer strings are free of string tokens directed to the first semantic object type, and require the user to draw an relationship as between the first and second semantic object type.

The first semantic object type and the second semantic object type related through a common sense or common classification relationship that may be relatively straightforward for a human to determine, but may be difficult for automated software (e.g., AI bot) to determine. For example, the relationship could require a logical gap as between categories in a question stem and concrete objects in the questions, requiring common sense to fill the gap. In the example above, any person with common sense can easily tell the statement A is true, but B, C, D are false.

Furthermore, in an embodiment, an additional layer of difficulty is provided through establishing hypothetical positional relationships as between the objects in the candidate answer strings, instead of posing the positional relation as directly between the objects of the question string. A path finding exercise may thus be required to establish which of the candidate answer strings are correct. Path finding exercises and positional relationships (e.g., in Euclidean space) add an additional requirement of common sense reasoning, which helps distinguish between automated software and human interactions. In another embodiment, another paradigm can include common sense object classifications.

At 308, an input is provided by the computing device, indicating a selection of a subset (e.g., through radio button selections, a list of interactive checkboxes). If the selected subset of the plurality of candidate answer strings match the one or more correct answer strings, access is provisioned to the service. For example, access control signals may be generated and transmitted, electrical signals can be sent, website traversal to a subsequent page or protected area is effected, etc.

In another aspect, further difficulty is further included in the method whereby the first semantic object type and the second semantic object type each pertain to otherwise disjointed taxonomic structures, and each question string of the one or more question strings includes a string subsection representing a stated overlap (e.g., establishing an overlap where none existed before) between the taxonomic structures of the first semantic object type and the second semantic object type to establish the common sense or common classification relationship; and the common sense or common classification relationship between the first semantic object type and the second semantic object type is represented in each correct answer string of the one or more correct answer strings.

In another aspect, a decoy mechanism is provided whereby the first semantic object type and the second semantic object type have a first common classification relationship, and wherein each question string of the one or more question strings includes a string subsection representing a stated overlap between the taxonomic structures of the first semantic object type and the second semantic object type to establish a second common classification relationship.

Both the first common classification relationship and the second common classification relationship between the first semantic object type and the second semantic object type are represented in each correct answer string of the one or more correct answer strings. However, in this example, the plurality of candidate answer strings includes a decoy subset having one or more decoy answer strings, the decoy subset based on the first common classification relationship only, or the second common classification relationship only.

If an automated service is traversing the question, it may catch one but not both relationships and select only answers where only one relationship is expressed. If so, in a preferred embodiment, at 310, responsive to the selected subset of the plurality of candidate answer strings matching the one or more decoy answer strings, the computing device is added to a blacklist data structure, denoting it as a potential automated service.

Corresponding devices, systems, and apparatuses are contemplated, including corresponding computer readable media (e.g., diskettes) storing machine interpretable instructions (e.g., object code, compiled binaries, source code), which when executed by a processor, cause the processor to perform steps of methods described herein.

Figure 4:
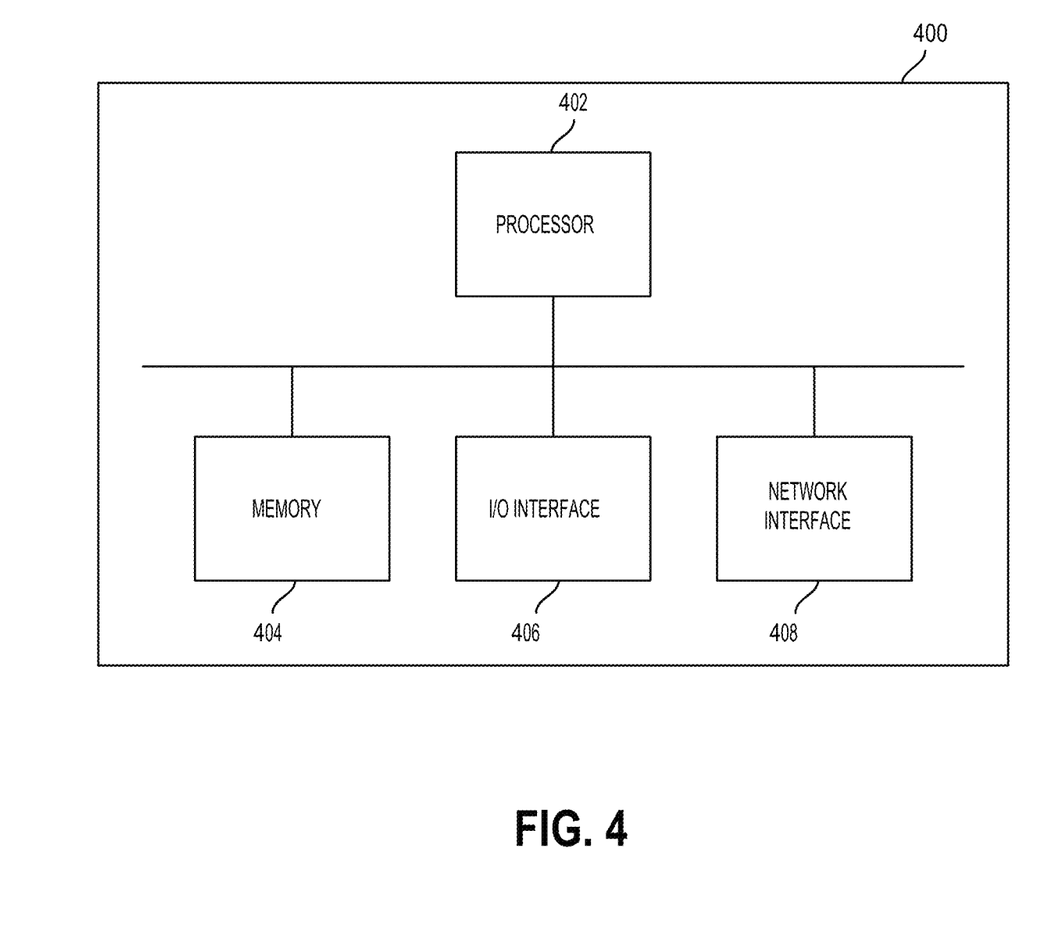
FIG. 4 is a schematic diagram of a computing device such as a server.

FIG. 4 is a schematic diagram of a computing device 400 such as a server. As depicted, the computing device includes at least one processor 402, memory 404, at least one I/O interface 406, and at least one network interface 408.

Processor 402 may be an Intel or AMD x86 or x64, PowerPC, ARM processor, or the like. Memory 404 may include a suitable combination of computer memory that is located either internally or externally such as, for example, random-access memory (RAM), read-only memory (ROM), compact disc read-only memory (CDROM).

Each I/O interface 406 enables computing device 400 to interconnect with one or more input devices, such as a keyboard, mouse, camera, touch screen and a microphone, or with one or more output devices such as a display screen and a speaker.

Each network interface 408 enables computing device 400 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. WMAX), SS7 signaling network, fixed line, local area network, wide area network, and others.

Computing device 400 is operable to register and authenticate users (using a login, unique identifier, and password for example) prior to providing access to applications, a local network, network resources, other networks and network security devices. Computing devices 400 may serve one user or multiple users.

Figure 5:
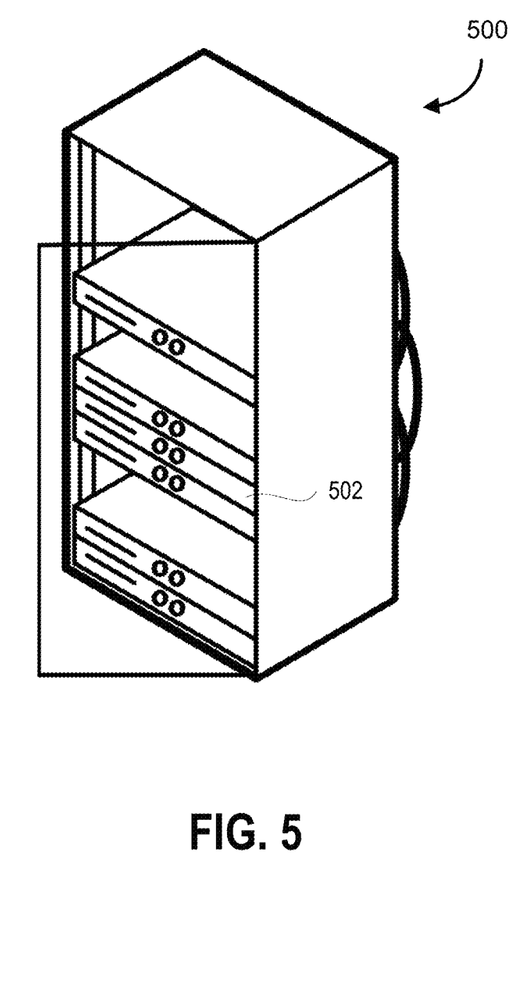
FIG. 5 is an illustration of a special purpose machine, according to some embodiments that may reside at a data center.

FIG. 5 is an illustration of a special purpose machine 502, according to some embodiments that may reside at a data center. The special purpose machine 502, for example, incorporates the features of the system 100 and is provided in a portable computing mechanism that, for example, may be placed into a data center as a rack server or rack server component that interoperates and interconnects with other devices, for example, across a network or a message bus.

The special purpose machine 502, in some embodiments, is a backend server device that is configured to interoperate with a hosted service to control provisioning of access based on an improved human/automated system filtration mechanism, which in some embodiments is configured to establish decoy answers to maintain a blacklist of suspected automated system computing devices.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

An example data structure and example pseudocode is provided below to provide an example algorithm that can be used to provide a method in accordance with some embodiments described herein. The data structure and pseudocode are illustrative, non-limiting examples. The method can be encapsulated in the form of machine readable instructions affixed in a non-transitory computer readable medium for execution on a processor of a computer.

```
#Data Structure in a JSON file
{
    "name": string,
    "childCategories": [Category],
    "childInstances": [Instance],
    "properties": {propertyName:propertyValue, ...}
}
------------------------------------------------------------
#Category as a python object
Category
    name: String
    childCategories: [Category]
    childInstances: [Instance]
    properties: {propertyName:propertyValue, ...}
    getInstances( ): [Instance]
#Instance as a python object
Instance
    name: String
    properties: {propertyName:propertyValue, ...}
```

-continued

```
#QuestionAnswer as a python object
QA
    question: String
    answers: [(String, String, Boolean)]
------------------------------------------------------------
#Challenge template with Natural Language Understanding + Taxonomic
Reasoning + Logic-based Reasoning + Data Poisoning
    #for each scenarioTemplate, create a scenarioCandidateCategories
    scenarioCandidateCategories := [Category, ...]
    #scenario template
    scenarioTemplate(scenarioCandidateCategories, optionNum)
        if optionNum < 4 then optionNum := 4
        correctAnswerNum := randrange(2, optionNum)
        wrongAnswerNum := optionNum - correctAnswerNum
        #randomly choose 2 target categoires cate1 and cate2 from the
scenarioCandidateCategories
        shuffle(scenarioCandidateCategories)
        cate1 := scenarioCandidateCategories[0]
        cate2 := scenarioCandidateCategories[1]
        #randomly choose 1 mutant category from scenarioCandidateCategories other
than cate1 and cate2
        mutant         :=       scenarioCandidateCategories[randrange(2,
len(scenarioCandidateCategories))]
        #randomly choose a mutant target catetory from cate1 and cate2
        mutantTarget := scenarioCandidateCategories[randrange(0, 2)]
        shuffle(mutant.childCategories)
        #randomly choose a sub-mutant category which map to the mutantTarget
category
        subMutantYes := mutant.childCategories[0]
        #randomly choose a sub-mutant category which doesnt' map to mutantTarget
category
        subMutants No        :=       mutant.childCategories[randrange(1,
len(mutant.childcategories))]
        #generate the question related to cate1, cate2, mutant, subMutantYes,
subMutantsNo
        question := "Need to two objects belong to {cate1} and {cate2}. \
                    But in some place or some time, {subMutantYes} is also
{mutantTarget=cate1/cate2}, \
                    which of the following options may be true?"
        #put the question into QuestionAnswer object
        qa = QA(question, [ ])
        #generate the answers and put them into QuestionAnswer object
        i = 0
        while (i < correctAnswerNum)
            if (cate1 == mutantTarget)
                c1 = shuffle(cate1.getInstances( ) + subMutantYes.getInstances( ))[0]
                c2 = shuffle(cate2.getInstances( ))[0]
            else
                c1 = shuffle(cate1.getInstances( ))[0]
                c2 = shuffle(cate2.getInstances( ) + subMutantYes.getInstances( ))[0]
            answer := (c1, c2, True)
            qa.answers.append(answer)
            i++
        i = 0
        while (i < wrongAnswerNum)
            if (cate1 == mutantTarget)
                c1 = shuffle(subMutantNo.getInstances( ))[0]
                c2 = shuffle(cate2.getInstances( ))[0]
            else
                c1 = shuffle(cate1.getInstances( ))[0]
                c2 = shuffle(subMutantNo.getInstances( ))[0]
            answer := (c1, c2, False)
            qa.answers.append(answer)
            i++
        shuffle(qa.answers)
        return qa
```

As can be understood, the examples described above and illustrated are intended to be exemplary only.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

What is claimed is:

1. A computer system for controlling access to a hosted service by providing an automated process discriminator adapted for security hardening against automated processes that utilize trained neural networks, the system comprising:
    a processor;
    a non-transitory computer-readable memory device storing machine-readable instructions;
    wherein the processor is configured to, when executing the machine-readable instructions:

generate, for recordal on a backend question bank data storage, one or more question strings and a plurality of candidate answer strings having one or more correct answer strings, each question string stored on the backend question bank data storage including at least a question including question string tokens directed to a first semantic object type, and each of the candidate answer strings including answer string tokens directed to a second semantic object type and free of string tokens directed to the first semantic object type, the first semantic object type and the second semantic object type related through one or more transformed classification relationships, wherein at least one relationship of the one or more transformed classification relationships comprises a mutant relationship that is inconsistent with conventional knowledge in a physical world;

control rendering of the one or more question strings and the plurality of candidate answer strings on a display of a computing device requesting access to the hosted service;

receive, from the computing device, one or more input data sets representing a selected subset of the plurality of candidate answer strings; and responsive to the selected subset of the plurality of candidate answer strings matching the one or more correct answer strings, generate signals for provisioning access to the hosted service.

2. The system of claim 1, wherein the one or more question strings are each directed to questions in relation to a positional arrangement of objects of the first semantic object type, and the plurality of candidate answer strings are directed to answers in relation to a positional arrangement of objects of the second semantic object type; and wherein the one or more correct answer strings are directed to correct statements whereby the positional arrangement of objects of the first semantic object type is represented in accordance with objects of the second semantic object type.

3. The system of claim 1, wherein the first semantic object type includes object classifications, and wherein the second semantic object type includes tangible objects, and wherein the one or more transformed classification relationships between the object classifications and the tangible objects is represented in each correct answer string of the one or more correct answer strings.

4. The system of claim 3, wherein the first semantic object type and the second semantic object type each pertain to otherwise disjointed taxonomic structures, and wherein each question string of the one or more question strings includes a string subsection representing a stated overlap between the taxonomic structures of the first semantic object type and the second semantic object type to establish the one or more transformed classification relationships; and wherein the one or more transformed classification relationships between the first semantic object type and the second semantic object type is represented in each correct answer string of the one or more correct answer strings.

5. The system of claim 3, wherein the first semantic object type and the second semantic object type have a first common classification relationship, and wherein each question string of the one or more question strings includes a string subsection representing a stated overlap between the taxonomic structures of the first semantic object type and the second semantic object type to establish a second common classification relationship;

wherein both the first common classification relationship and the second common classification relationship between the first semantic object type and the second semantic object type is represented in each correct answer string of the one or more correct answer strings; and wherein the plurality of candidate answer strings includes a decoy subset having one or more decoy answer strings.

6. The system of claim 5, wherein the processor is further configured to:

responsive to the selected subset of the plurality of candidate answer strings matching the one or more decoy answer strings, generate signals for appending an identifier of the computing device to a blacklist data structure.

7. The system of claim 6, wherein the blacklist data structure maintains a record of identifiers of computing devices suspected of being reverse-Turing test solving automatons.

8. The system of claim 1, wherein the one or more question strings and the plurality of candidate answer strings are rendered as webpage objects, and wherein the plurality of candidate answer strings are interactive webpage objects that are selectable to establish the selected subset of the plurality of candidate answer strings.

9. The system of claim 2, wherein the one or more transformed classification relationships is established as a location in which the objects of the first semantic object type reside or the positional arrangement of objects is based on a hypothetical geographical positional arrangement in Euclidean space.

10. The system of claim 1, wherein a number of transformed classification relationships of the one or more transformed classification relationships or a number of plurality of candidate answer strings is determined dynamically based on a suspicion score associated with a particular user of the hosted service, the suspicion score determined at least based on monitored usage characteristics of the hosted service.

11. A computer implemented method for controlling access to a hosted service, the method comprising:

retrieving, from a backend question bank data storage, one or more question strings and a plurality of candidate answer strings having one or more correct answer strings, each question string stored on the backend question bank data storage including at least a question including question string tokens directed to a first semantic object type, and each of the candidate answer strings including answer string tokens directed to a second semantic object type and free of string tokens directed to the first semantic object type, the first semantic object type and the second semantic object type related through one or more transformed classification relationships, wherein at least one relationship of the one or more transformed classification relationships comprises a mutant relationship that is inconsistent with conventional knowledge in a physical world;

rendering the one or more question strings and the plurality of candidate answer strings on a display of a computing device requesting access to the hosted service;

receiving, from the computing device, one or more input data sets representing a selected subset of the plurality of candidate answer strings; and responsive to the selected subset of the plurality of candidate answer strings matching the one or more correct answer strings, generating signals for provisioning access to the hosted service.

12. The method of claim 11, wherein the one or more question strings are each directed to questions in relation to a positional arrangement of objects of the first semantic object type, and the plurality of candidate answer strings are directed to answers in relation to a positional arrangement of objects of the second semantic object type; and wherein the one or more correct answer strings are directed to correct statements whereby the positional arrangement of objects of the first semantic object type is represented in accordance with objects of the second semantic object type.

13. The method of claim 11, wherein the first semantic object type includes object classifications, and wherein the second semantic object type includes tangible objects, and wherein the one or more transformed classification relationships between the object classifications and the tangible objects is represented in each correct answer string of the one or more correct answer strings.

14. The method of claim 13, wherein the first semantic object type and the second semantic object type each pertain to otherwise disjoint taxonomic structures, and wherein each question string of the one or more question strings includes a string subsection representing a stated overlap between the taxonomic structures of the first semantic object type and the second semantic object type to establish the one or more transformed classification relationships; and wherein the one or more transformed classification relationships between the first semantic object type and the second semantic object type is represented in each correct answer string of the one or more correct answer strings.

15. The method of claim 13, wherein the first semantic object type and the second semantic object type have a first common classification relationship, and wherein each question string of the one or more question strings includes a string subsection representing a stated overlap between the taxonomic structures of the first semantic object type and the second semantic object type to establish a second common classification relationship;

wherein both the first common classification relationship and the second common classification relationship between the first semantic object type and the second semantic object type is represented in each correct answer string of the one or more correct answer strings; and wherein the plurality of candidate answer strings includes a decoy subset having one or more decoy answer strings.

16. The method of claim 15, comprising:

responsive to the selected subset of the plurality of candidate answer strings matching the one or more decoy answer strings, generating signals for appending an identifier of the computing device to a blacklist data structure.

17. The method of claim 16, wherein the blacklist data structure maintains a record of identifiers of computing devices suspected of being reverse-Turing test solving automatons.

18. The method of claim 11, wherein the one or more question strings and the plurality of candidate answer strings are rendered as webpage objects, and wherein the plurality of candidate answer strings are interactive webpage objects that are selectable to establish the selected subset of the plurality of candidate answer strings.

19. The method of claim 12, wherein the one or more transformed classification relationships is established as a location in which the objects of the first semantic object type reside or the positional arrangement of objects is based on a hypothetical geographical positional arrangement in Euclidean space.

20. A non-transitory computer readable medium storing machine interpretable instructions, which when executed, cause a processor to perform steps of a method for controlling access to a hosted service, the method comprising:

retrieving, from a backend question bank data storage, one or more question strings and a plurality of candidate answer strings having one or more correct answer strings, each question string stored on the backend question bank data storage including at least a question including question string tokens directed to a first semantic object type, and each of the candidate answer strings including answer string tokens directed to a second semantic object type and free of string tokens directed to the first semantic object type, the first semantic object type and the second semantic object type related through one or more transformed classification relationships, wherein at least one relationship of the one or more transformed classification relationships comprises a mutant relationship that is inconsistent with conventional knowledge in a physical world;

rendering the one or more question strings and the plurality of candidate answer strings on a display of a computing device requesting access to the hosted service;

receiving, from the computing device, one or more input data sets representing a selected subset of the plurality of candidate answer strings; and responsive to the selected subset of the plurality of candidate answer strings matching the one or more correct answer strings, generating signals for provisioning access to the hosted service.

\* \* \* \* \*